United States Patent
Steiner et al.

(10) Patent No.: US 9,550,537 B2
(45) Date of Patent: Jan. 24, 2017

(54) CROWN FOR A LINK IN A GROUND ENGAGING TRACK SYSTEM

(71) Applicant: Caterpillar Inc., Peoria, IL (US)

(72) Inventors: Kevin Steiner, Tremont, IL (US);
Caroline Brewer, Peoria, IL (US);
Temitope Akinlua, Peoria, IL (US);
Daniel Knobloch, Morton, IL (US);
Donovan Clarke, Hanna City, IL (US);
Timothy Nenne, Wenona, IL (US)

(73) Assignee: Caterpillar Inc., Peoria, IL (US)

( * ) Notice: Subject to any disclaimer, the term of this patent is extended or adjusted under 35 U.S.C. 154(b) by 144 days.

(21) Appl. No.: 14/543,045

(22) Filed: Nov. 17, 2014

(65) Prior Publication Data
US 2016/0137239 A1    May 19, 2016

(51) Int. Cl.
*B62D 55/21*    (2006.01)

(52) U.S. Cl.
CPC .................. *B62D 55/21* (2013.01)

(58) Field of Classification Search
CPC ......... B62D 55/14; B62D 55/18; B62D 55/20; B62D 55/21; B62D 55/202; B62D 55/205
USPC ........ 305/135, 142, 185, 195, 196, 200, 201
See application file for complete search history.

(56) References Cited

U.S. PATENT DOCUMENTS

| | | | |
|---|---|---|---|
| 1,344,378 A * | 6/1920 | Butler ................ | F41B 3/03 124/7 |
| 3,955,855 A | 5/1976 | Massieon et al. | |
| 4,324,437 A * | 4/1982 | Narang ................ | B62D 55/20 305/106 |
| 4,423,910 A * | 1/1984 | Narang ................ | B62D 55/20 305/100 |
| 5,500,058 A * | 3/1996 | Hirakawa ............. | B21K 23/02 148/649 |
| 7,040,697 B1 * | 5/2006 | Tuccinardi .......... | B60R 11/0235 297/188.04 |
| 7,325,889 B2 * | 2/2008 | Yamamoto ............. | B62D 55/21 305/201 |
| 7,338,138 B2 * | 3/2008 | Sho ....................... | B62D 55/20 148/663 |
| 7,657,990 B2 * | 2/2010 | Wodrich ................ | B62D 55/15 29/527.4 |

(Continued)

FOREIGN PATENT DOCUMENTS

| | | |
|---|---|---|
| JP | 5372336 B2 | 9/2013 |
| WO | 00/29276 A1 | 5/2000 |

*Primary Examiner* — S. Joseph Morano
*Assistant Examiner* — Jean Charleston
(74) *Attorney, Agent, or Firm* — Finnegan, Henderson, Farabow, Garrett & Dunner, LLP

(57) ABSTRACT

The disclosure relates to a system and method for a link for a track chain in a ground-engaging track system. The link has an elongate link body including a first and a second crown. The elongate link body includes a shoe surface and a rail surface. The shoe surface is configured to contact a track shoe coupled to the elongate link body. The rail surface is opposite the shoe surface and has a first end section, a middle section, and a second end section. The first and second crowns on the rail surface each define a convex portion of the rail surface. The first crown is positioned on the first end section and the second crown is positioned on the second end section. The first and second crowns are configured to delay scallop formation in the rail surface.

18 Claims, 5 Drawing Sheets

(56) References Cited

U.S. PATENT DOCUMENTS

| | | | | |
|---|---|---|---|---|
| 7,805,209 | B2 * | 9/2010 | Bechtel | G05B 9/02 |
| | | | | 250/221 |
| 7,806,209 | B2 * | 10/2010 | Standish | B62D 55/096 |
| | | | | 180/9.1 |
| 8,540,325 | B2 | 9/2013 | Diekevers et al. | |
| 2012/0267859 | A1 | 10/2012 | Liang et al. | |
| 2014/0001830 | A1 | 1/2014 | Meyer et al. | |
| 2014/0001831 | A1 | 1/2014 | Thorson et al. | |
| 2014/0083782 | A1 | 3/2014 | Brewer et al. | |

\* cited by examiner

CROWN FOR A LINK IN A GROUND ENGAGING TRACK SYSTEM

TECHNICAL FIELD

This disclosure relates generally to machines having ground engaging track systems, and more particularly, to a link that can delay the formation of scallops.

BACKGROUND

A wide variety of machines utilize tracks as ground engaging propulsion elements. It is common for such tracks to include a plurality of rotatable track engaging elements, with the track forming an endless loop moved about the rotating elements during operation. Such tracks typically include two chains of coupled together links, with bolted-on track shoes. The demands placed upon such machines and their associated track assemblies can be quite substantial, and the operating environments harsh. Machine tracks are often robust to provide a long operating life of thousands of hours despite significant mechanical stresses, strain and wear experienced during operation.

The wear phenomena experienced by machine track is typically a result of how the machine is used, the experience of the operator, and both the underfoot conditions and substrate materials in the operating environment. Field service life of machine track can vary based upon these factors from a few thousand hours to many thousands of hours. Since machine track components can be relatively costly, and servicing can add expense and machine down-time, engineers have long sought strategies for reducing and managing wear between and among the components.

Japanese Patent No. 5,372,336 (hereinafter "the '336 patent"), purports to describe a track chain and undercarriage track roller, whereby the track chain is made up of links having a metallurgically bonded coating. According to the '336 patent, a wear resistant coating is welded onto a surface, undercut, or channel. The coating is positioned on the track roller at a location that is susceptible to wear during the operation of the track chain. However, slower wearing material is only added to a track chain link as a secondary operation, which can impact uniformity between links in a track chain, increase manufacturing time, and minimize durability. This list is merely exemplary and other issues and challenges certainly exist in practice.

Thus, an improved link for a ground-engaging track system is desired that may reduce and manage wear, thereby extending the life operating life of the system.

SUMMARY

An aspect of the present disclosure provides a link for a track chain in a ground-engaging track system. The link includes an elongate link body, a first crown, and a second crown. The elongate link body includes a shoe surface and a rail surface. The shoe surface is configured to contact a track shoe coupled to the elongate link body. The rail surface is opposite the shoe surface and has a first end section, a middle section, and a second end section. The first and second crowns on the rail surface each define a convex portion of the rail surface. The first crown is positioned on the first end section and the second crown is positioned on the second end section. The first and second crowns are configured to delay scallop formation in the rail surface.

Another aspect of the present disclosure provides a track assembly which includes a plurality of track shoes and a plurality of elongate links. Each of the plurality of elongate links is connected to form a track chain. The plurality of track shoes is coupled to the track chain. Each of the elongate links includes a lower surface, a rail surface, first crown, and a second crown. The lower surface is configured to contact one of the track shoes. The rail surface is opposite the lower surface and has a first end section, a middle section, and a second end section. The first and second crowns each define a convex portion of the rail surface. The first crown is positioned on the first end section and the second crown is positioned on the second end section. Each of the crowns is configured to delay scallop formation in the rail surface.

Another aspect of the present disclosure provides a link for a track chain in a ground-engaging track system. The link includes an elongate link body, a first crown, a second crown, and a third crown. The elongate link body includes a shoe surface and a rail surface. The shoe surface is configured to contact a track shoe coupled to the elongate link body. The rail surface is opposite the shoe surface and has a first end section, a middle section, and a second end section. The first, second, and third crowns on the rail surface each define a convex portion of the rail surface. The first crown is positioned on the first end section, the second crown is positioned on the second end section, and the third crown is positioned on the middle section. The middle section has a middle section length and the first and second end sections have equal end section lengths. The length of the middle section is greater than the sum of the lengths of the first end section and the second end section. The first, second, and third crowns are configured to delay scallop formation in the rail surface.

DETAILED DESCRIPTION

The disclosure relates generally to a system and method for a ground-engaging track system having a plurality of links. The plurality of links form a track assembly configured to interface with rotatable track-engaging elements. The track system may be used on vehicles such as tractors, bulldozers, excavators, or the like, to spread the area of the weight of the vehicle over a larger surface area. During operation, the track assembly may rotate about the rotatable track-engaging elements, whereby a surface on each the plurality of links may contact each rotatable track-engaging element. The surface of each link may include at least two crowns configured to reduce wear and extend the life of each link.

Figure 1:
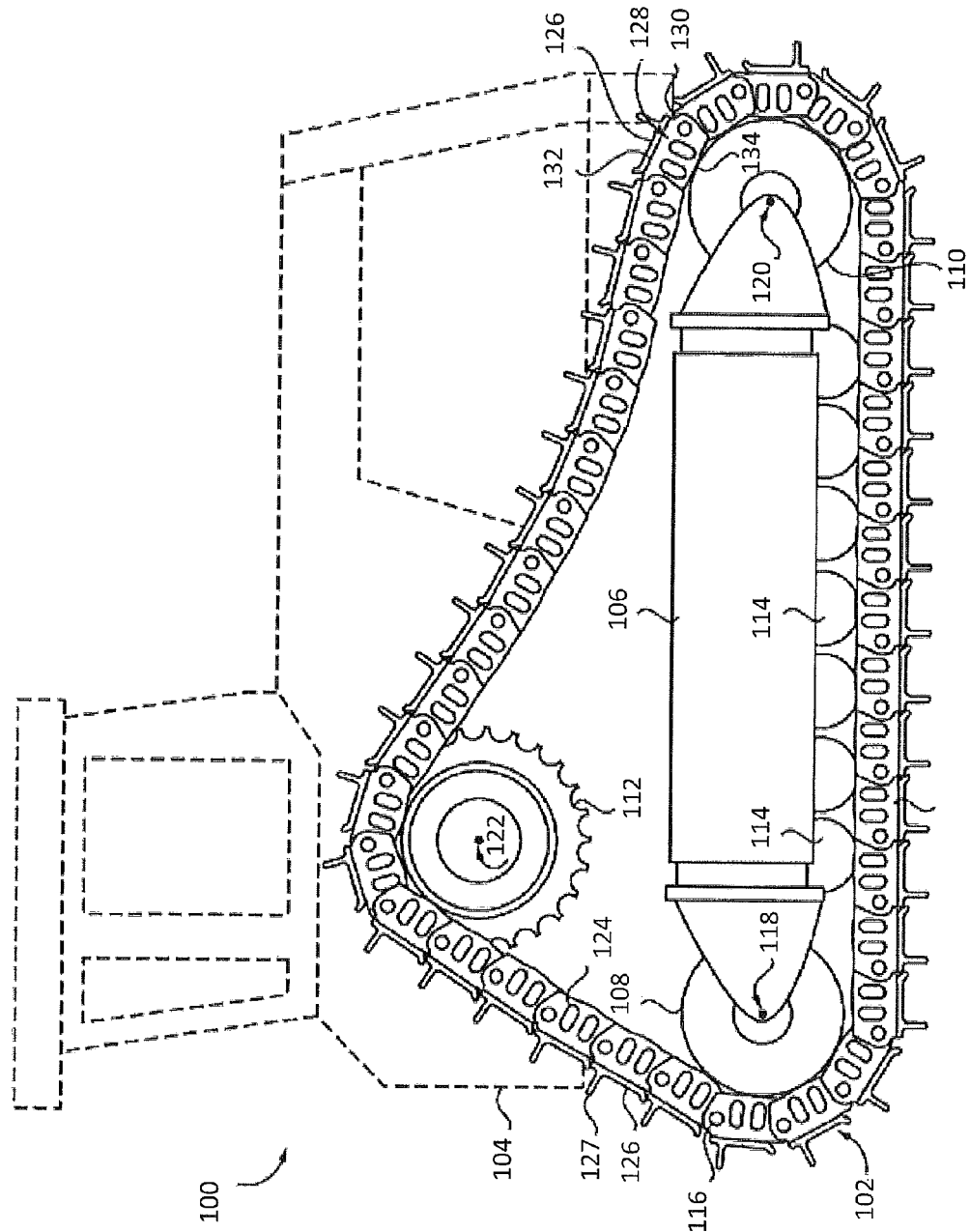
FIG. 1 is a side view of a machine having a ground-engaging track system, according to an aspect of the disclosure.

FIG. 1 illustrates a schematic of a machine 100 including a ground-engaging track system 102. The machine 100 is shown in the context of a track-type tractor, but could be any of a variety of other machines such as a tracked loader, a half-track machine, or the like. The track system 102 may be one of two separate track systems positioned at opposite sides of machine 100 in a conventional manner. The track system 102 may further include a track roller frame 106 coupled with the machine frame 104, and a plurality of rotatable track-engaging elements 108, 110, and 112. In one embodiment, the rotatable track engaging elements 108 and 110 include rotatable idlers configured to rotate passively during operation of the track system 102, whereas element 112 includes a sprocket configured to drive the track system 102. The track system 102 may further include a plurality of track rollers 114 mounted to the track roller frame 106. The track rollers 114 may be configured to bear all or substantially all of the weight of the machine 100. The track system 102 further includes a track assembly 116 extending about each of rotatable track-engaging elements 108, 110, and 112 and track rollers 114. The elements 108, 110 and 112 each define an axis of rotation 118, 120, and 122, respectively, which axes may be parallel and arranged in a triangular pattern as shown. The track assembly 116 may thus define a travel path about the elements 118, 120, and 122 having a generally triangular shape. The embodiment shown in FIG. 1 may be understood by those skilled in the art as a "high-drive" track system, however, it should be appreciated that the present disclosure relates to various configurations of track systems.

The track assembly 116 may include a first track chain 124, a second track chain 202 (FIG. 2) which is hidden from view by track chain 124 in FIG. 1, and a plurality of track shoes 126 coupled with the first track chain 124 and the second track chain 202. Each of the track shoes 126 may include one or more grousers 127 in a conventional manner. Each of the first and second track chains 124/202 may also include a plurality of elongate links 128, each including a link body 130. Each link body 130 may include a shoe surface 132 and a rail surface 134. The shoe surface 132 may be in contact with one of the track shoes 126 and the rail surface 134 may be in contact with one of the rotatable track engaging elements 108 and 110, or configured to contact one of those elements via advancing of the track assembly 116 during operation.

The rail surface 134 may be formed of a sacrificial wear material, as further described herein, and configured to delay scallop formation in the rail surface 134 resulting from the contact with rotatable track engaging elements 108 and 110, and track rollers 114. It should be appreciated that the rail surface 134 of each link 128 and 203 (FIG. 2) together form rails in the two track chains 124 and 202 upon which idlers 108 and 110 and track rollers 114 ride. Drive sprocket 112, in contrast, may contact track assembly 116 between links 128 and 203 rather than upon the rails.

Figure 2:
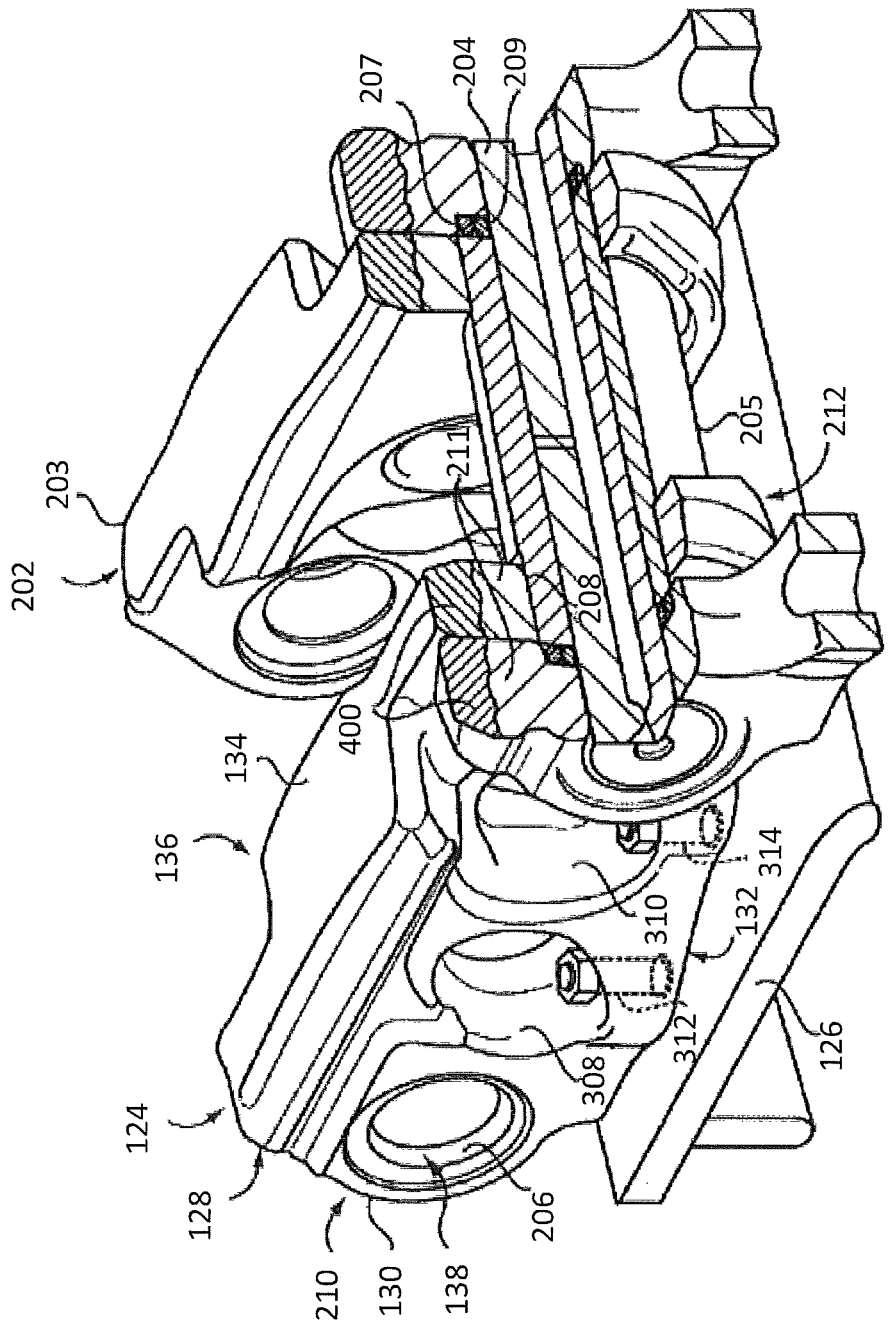
FIG. 2 is an isometric view of a portion of a ground-engaging track system, according to an aspect of the disclosure.
Figure 3:
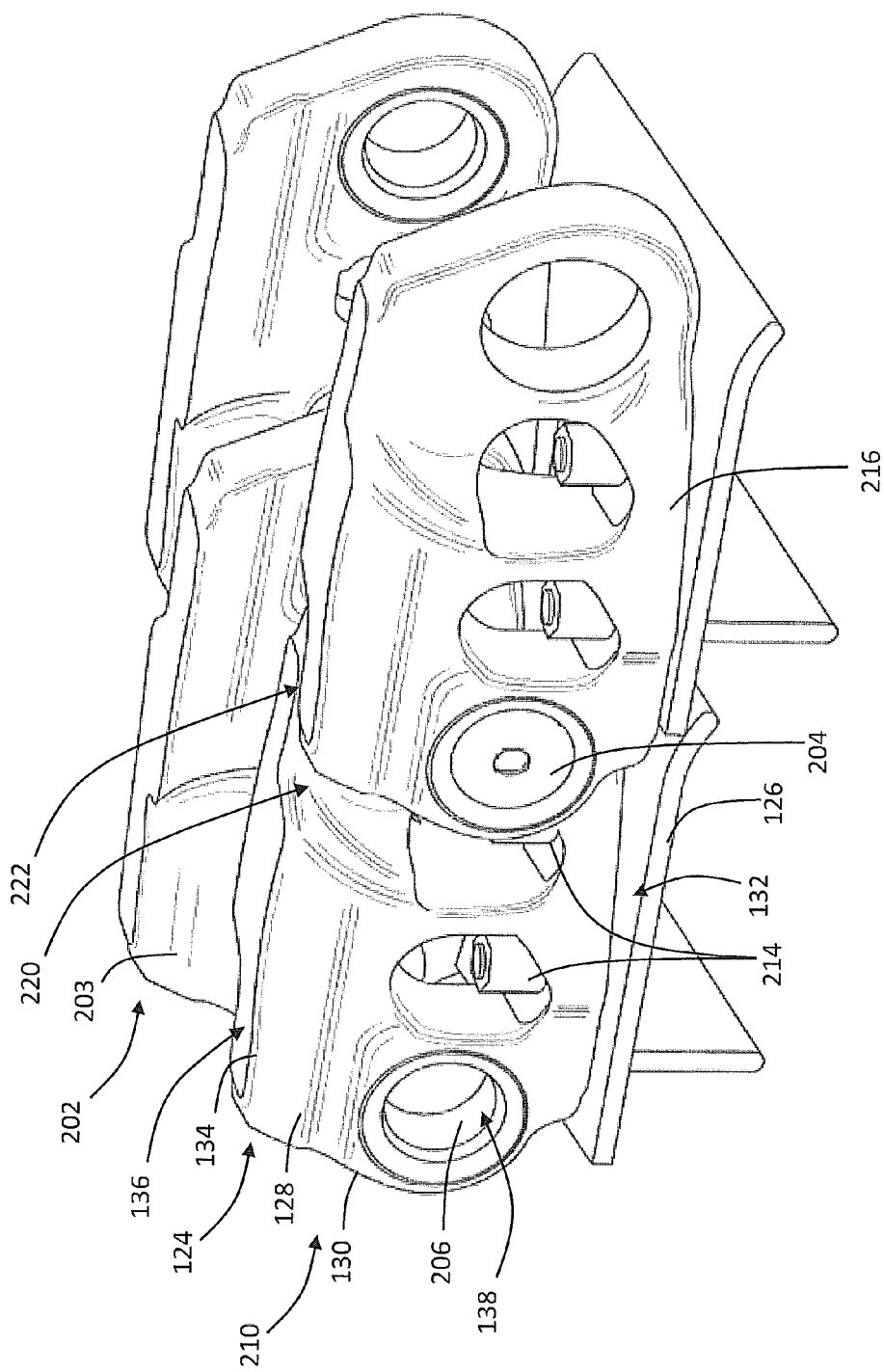
FIG. 3 is an isometric view of a link, according to an aspect of the disclosure.
Figure 4:
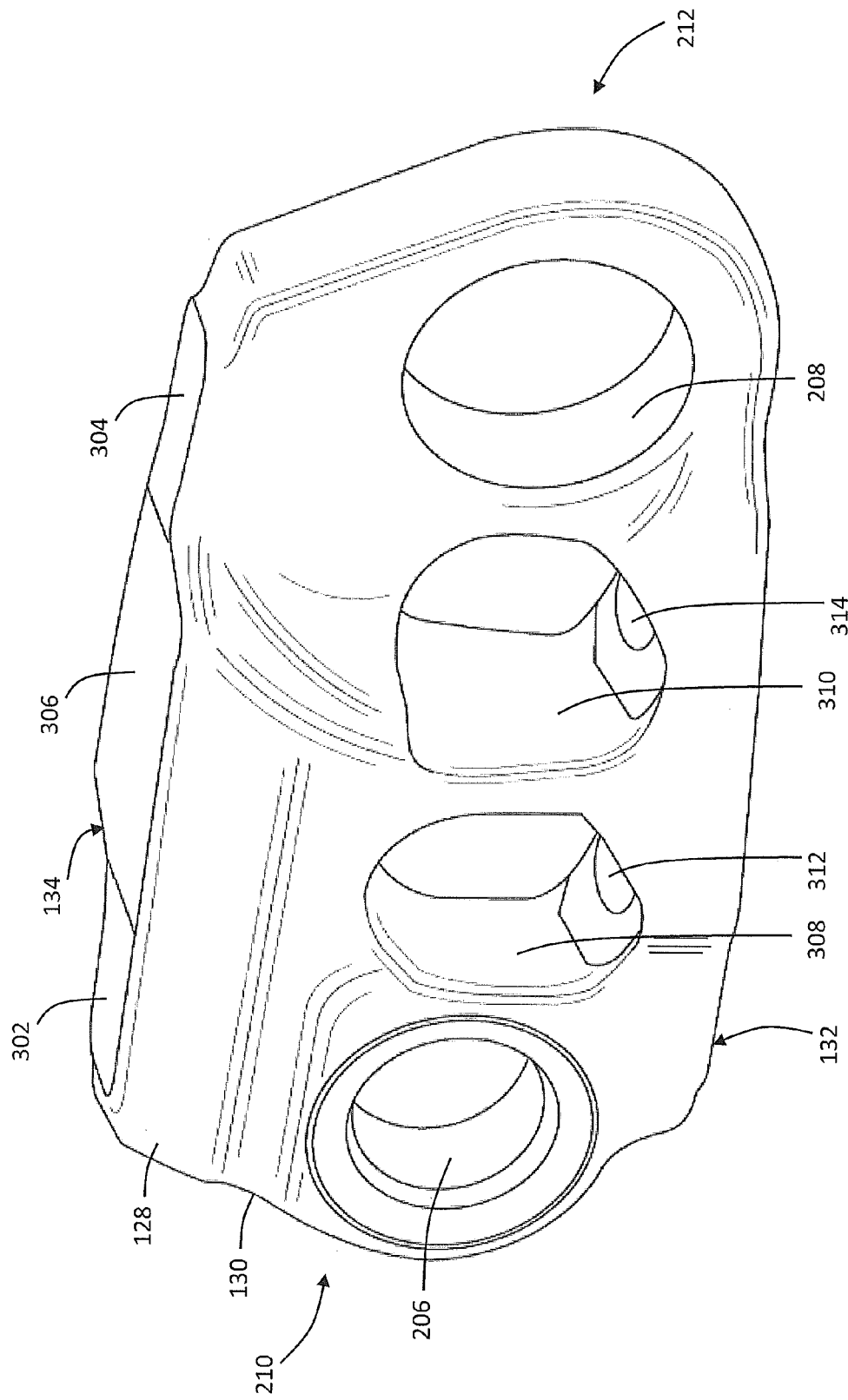
FIG. 4 is a side view of an embodiment of a link contacting a rotatable track-engaging element.

Referring now to FIGS. 2, 3, and 4, the first track chain 124 may be coupled with the second track chain 202 via a plurality of track pins, one of which is identified as pin 204. A plurality of bushings 205, which may be rotatable or fixed, may be positioned upon the plurality of track pins. Track assembly 116 may further be equipped with a plurality of track seals 207 associated with each set of bushings 205 and track pins, and a plurality of thrust rings 209. It should be appreciated that in an embodiment, each link within track chain 124 and its counterpart link in track chain 202 may be mirror images of one another. Accordingly, the present description should be understood to refer to any of the links in either of track chains 124 or 202 with consideration to the mirror image relationship.

The link body 130 may include an inboard side 136 and an outboard side 138. The link body 130 may define a track pin bore 206 formed in a first link body end 210, and a bushing bore 208 formed in a second link body end 212. The track pin bore 206 and the bushing bore 208 communicate between inboard side 136 and outboard side 138. In an embodiment, the track pin bore 206 may have an interference fit with one of the track pins, whereas the bushing bore 208 may have an interference fit with one of the bushings. The bores 206 and 208 may be defined by an unhardened material so as to avoid difficulties in forming interference fits. It should be appreciated that various material hardnesses may be used and the present disclosure should not be limited to any particular material.

In an embodiment, links 128 and 203 may be shaped such that bores 206 and 208 are laterally offset from one another, in other words not aligned in an inboard to outboard direction. In this embodiment, the track chains 124 and 202 may include a single wide portion 220 and a double wide portion 222. The single wide portion 220 is defined by the section of the track chain 124 where two consecutive links 128 and 216 are coupled together and there is no overlap between the links 128 and 216. The double wide portion 222 is defined by the section of the track chain 124 where two consecutive links 128 and 216 are coupled together and there is an overlap between the links 128 and 216.

Referring to FIG. 4, the rail surface 134 may include a first end section 302, a second end section 304, and a middle section 306. The link 128 further defines a first window 308 and a second window 310 communicating between inboard side 136 and outboard side 138. A first bolt bore 312 and a second bolt bore 314 extend inwardly from the shoe surface 132 and intersect the first and second windows 308 and 310, respectively. The track system 102 further comprises bolts 214 which are received within bolting bores 312 and 314 and attach one of the track shoes 126 to the corresponding link 128.

Figure 5:
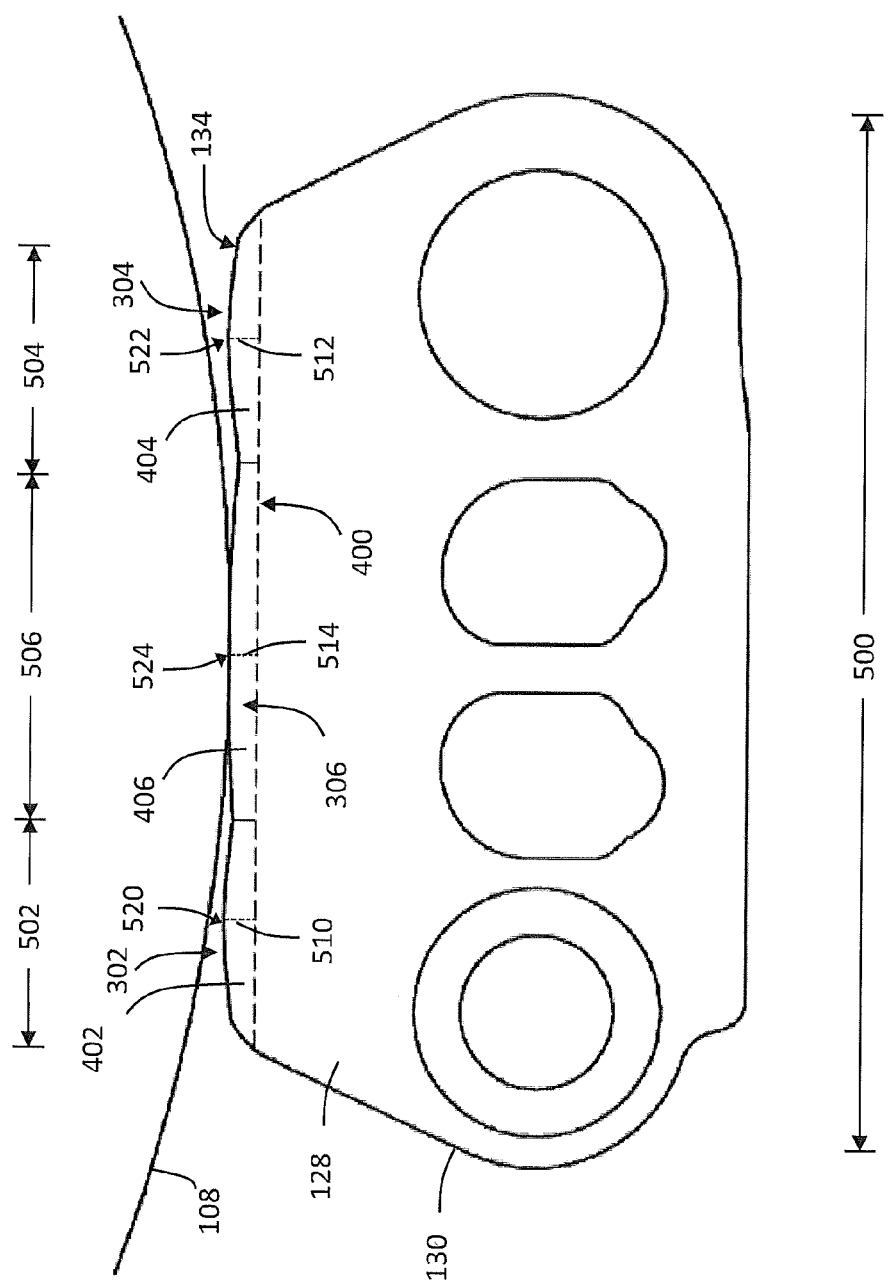
FIG. 5 is a side view of another embodiment of a link contacting a rotatable track-engaging element.

Referring now to FIG. 5, a side view of an embodiment of link 128 contacting the rotatable track-engaging element 108 is shown. This view shows the outboard side 138. As noted above, the rail surface 134 may include a middle section 306, a first end section 302, and a second end section 304. The rail surface 134 may be shaped with multiple convex longitudinal profiles or multiple crowns 400. The multiple crowns 400 may include crowns 402, 404, and 406 located on sections 302, 304, and 306, respectively.

The first crown 402 may extend across the first end section 302, the second crown 404 may extend across the second end section 304, and the third crown 406 may extend across the middle section 306. It should be appreciated that in other embodiments, each crown 402, 404, and 406 may extend entirely across its corresponding section or may extend across a portion of its corresponding section, whereby the multiple crowns 400 may only extend over a portion of the rail surface 134. In another embodiment, each crown 402, 404, and 406 may be positioned to extend over an area of the rail surface 134 where the wear rates are the highest, thereby reducing the wear rate in those particular areas. For example, the single wide portion 220 of a track chain 124 may have an increased rate of scallop formation, therefore, in an embodiment, the first crown 402 and/or the second crown 404 may be configured to extend across each corresponding single wide portion of the track chain 124.

The multiple crowns 400 may be made of a sacrificial wear material, which includes a hardened material such as might be formed via induction hardening or another hardening process, such that the crowns 400 may delay scallop formation in the rail surface 134 resulting from the contact with the rotatable track engaging elements 108 and 110, and potentially track rollers 114. Additionally, each link 128 may further include an unhardened material so as to avoid difficulties in forming the link 128. The multiple crowns 400 may be formed onto the rail surface 134 during the manufacture of the link 128. In an embodiment, a forging process may be used to form the crowns 400 during manufacture.

Also shown in FIG. 5 is a body length 500 of link body 130, a middle section length 506 of the middle section 306, a first end section length 502 of the first end section 302, and a second end section length 504 of the second end section 304. The middle section length 506 may be greater than a sum of the first section length 502 and the second section length 504. The first end section length 502 may be equal to the second section length 504. The crowns 402, 404, and 406 on each section 302, 304, and 306 may have lengths 502, 504, and 506, respectively. The crowns 402, 404, and 406 may define a radius of curvature (not numbered) having a longitudinal centerline of 510, 512, and 514, respectively. In an embodiment, each radius of curvature may be substantially the same; however, it should be appreciated that the radius of curvatures may vary between each crown 402, 404, and 406. In particular, each radius of curvature for each crown 402, 404, and 406 may be from about 500 millimeters to about 1000 millimeters. More specifically, the radius curvatures may be from about 800 millimeters to about 900 millimeters.

Each crown 402, 404, and 406 may include a peak 520, 522, and 524, respectively, coincident with the longitudinal centerline of each corresponding radius of curvature 510, 512, and 514. In an embodiment, the elevation of the peaks 520, 522, and 524 are in a common plane. In another embodiment, the elevation of peaks 520 and 522 are in a common plane, whereas the peak of the third crown 524 is in a different plane, either more or less elevated than the first crown peak 520 and second crown peak 522. The difference in elevation between the first and second crown peaks 520 and 522 with the third crown peak 524 may be in the range of 0 millimeters to about 12 millimeters.

In another embodiment, the rail surface 134 may include multiple crowns 400 defining a continuous or uniform surface (not shown). The uniform surface may extend continuously from the first end section 302 to the second end section 304, whereby the radius of curvature of each crown 402, 404, and 406 is approximately infinite. The uniform crown surface may be formed by rolling the crowns 400 during the hardening process, adding a filler material, or other method known in the art. It should be appreciated, that the rail surface 134 may also extend uniformly laterally from the outboard side 138 to the inboard side 136.

In further embodiments, the multiple crowns 400 may be configured to include a variety of profiles. For example, the crowns 402, 404, and 406 may be configured such that they form a single convex profile (not shown). In this example, crown 406 may have a higher peak 524 than the peaks of the first and second crowns 520 and 522. The crowns may be rolled or a filler material may be used to form a single convex profile. Another example may include the rail surface 134 being shaped with two crowns. This may include the first crown 402 and the second crown 404 positioned at the first end section 302 and the second end section 304, respectively, forming two convex profiles.

A method of operating the ground-engaging track system 102 having a link 128 includes advancing the track chains 124 and 202 about the plurality of rotatable track-engaging elements 108, 110, and 114, whereby the force for advancing the chains is provided by the sprocket 112. During advancement, the elongate links 128 engage with the rotatable track engaging elements 108, 110, and 114. The rail surface 134 of each of the elongate links 128 may contact each of the rotatable track engaging elements 108, 110, and 114. The crown 400 may be worn away during operation; however, scallop formation in the rail surface 134 produced by the contact with the plurality of rotatable elements 108, 110, and 114 may be delayed.

Recitation of ranges of values herein are merely intended to serve as a method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

INDUSTRIAL APPLICABILITY

The present disclosure provides an advantageous system and method for delaying the wear of a link 128 for a track assembly 116 in a ground-engaging track system 102. Track assemblies 116 have a limited life expectancy due to the extreme loads they encounter on a regular operating basis. In a single rotation of a standard track assembly, each link 128 is moved into engagement with a plurality of idlers 108/110 and rollers 114, and then moved out of engagement as advancement of the track assembly 124 progresses. The track assembly 116 may tend to transition from a straight configuration approaching an idler 108/110, to a curved configuration as the track moves about its path. As the track assembly 116 transitions from the straight configuration to the curved configuration, adjacent links in the chain become slightly closer together or further apart, as the case may be, and thus slide against the outer surface of the track engaging elements 108, 110, and 112. Over time, this contact causes deformations or scallops, which can result in vibration and bumps as the machine 100 travels across a substrate. Additionally, the operating life of the link 128 may be limited, and therefore, the operating life of the track assembly 116 may be limited. The scalloping of track links 128 can be a limiting factor in track service life, and the time and effort to replace a link 128 can be extensive, resulting in a high cost and lost operating time to the track system user.

By forming a crown 400 on a rail surface 134, scallop deformation may be delayed and the operating life of a track chain 124 may be prolonged. Specifically, using a crown configuration that includes positioning crowns in certain locations on the rail surface 134 may reduce wear in critical areas. These critical areas may include the single wide portion 220 of a track chain 124 or the middle section 306 of a link 128, among other areas. Further, by using multiple crowns 400 made of a hardened material and the link 128 being made of an unhardened material avoids difficulties in forming the link body 130 during manufacture.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A link for a track chain in a ground-engaging track system comprising:
    an elongate link body including:
        a shoe surface configured to contact a track shoe coupled to the elongate link body, and
        a rail surface opposite the shoe surface, the rail surface having a first end section, a middle section, and a second end section;
        first and second crowns on the rail surface that each define a convex portion of the rail surface, wherein the first crown is positioned on the first end section and the second crown is positioned on the second end section, and wherein the first and second crowns are configured to delay scallop formation in the rail surface; and
        the middle section of the rail surface including a third crown that defines a convex portion of the rail surface.

2. The link of claim 1, wherein the middle section has a middle section length and the first and second end sections have equal end section lengths, and wherein the length of the middle section is greater than the sum of the lengths of the first end section and the second end section.

3. The link of claim 1, wherein the rail surface forms a convex longitudinal profile that extends from the first end of the rail surface to the second end of the upper rail surface.

4. The link of claim 3, wherein the elongate link body has a body length, and wherein the radius of the convex longitudinal profile is greater than the body length.

5. The link of claim 1, wherein the first crown, the second crown, and the third crown form the entire rail surface.

6. The link of claim 1, wherein the first crown, the second crown, and the third crown define a uniform rail surface.

7. The link of claim 1, wherein the elongate link body further includes:
    an inboard side;
    an outboard side located on an opposing side of the link body from the inboard side;
    a track pin bore formed in a first link body end; and
    a bushing bore formed in a second link body end,
        wherein the track pin bore and the bushing bore communicate between the inboard and outboard sides and are configured to receive a track pin and bushing therein, respectively, for coupling the elongate link body with another elongate link body in the track chain.

8. The link of claim 1, wherein the first crown and the second crown each include a hardened material, and wherein the elongate link body further includes a material softer than the hardened material.

9. The link of claim 1, wherein the elongate link body is attached to at least one other elongate link body composing the track chain, wherein the attachment between the elongate link body and the at least one other elongate link body produces a single wide portion of the track chain, and wherein at least one of either the first crown and the second crown is further configured to extend over the single wide portion.

10. A track assembly comprising:
    a plurality of elongate links connected to form a track chain, each of the elongate links comprising:
        a lower surface configured to contact one of the track shoes;
        a rail surface opposite the lower surface, the rail surface having a first end section, a middle section, and a second end section;
        first and second crowns on the rail surface that each define a convex portion of the rail surface, wherein the first crown is positioned on the first end section and the second crown is positioned on the second end section, and wherein the first and second crowns are configured to delay scallop formation in the rail surface,
        the middle section of the rail surface including a third crown that defines a convex portion of the rail surface; and
    a plurality of track shoes coupled to the track chain.

11. The assembly of claim 10, wherein the middle section has a middle section length and the first and second end sections have equal end section lengths, and wherein the middle section length is greater than the sum of the lengths of the first end section and the second end section.

12. The assembly of claim 10, wherein the first crown, the second crown, and the third crown form the entire rail surface.

13. The assembly of claim 10, wherein the first crown, the second crown, and the third crown may be made of a sacrificial wear material.

14. The assembly of claim 13, wherein the sacrificial wear material includes a hardened material, and wherein each of the elongate links further includes a material softer than the hardened material.

15. The assembly of claim 10, further comprising rotatable track engaging elements including a first idler, a second idler, a drive sprocket, and a plurality of track rollers, wherein the track assembly defines a travel path extending about each of the first and second idlers, the drive sprocket, and the plurality of track rollers, and wherein the first and second idlers and the drive sprocket have parallel axes of rotation arranged in a triangular pattern.

16. The assembly of claim 10, further comprising a second track chain including a plurality of elongate links, wherein each of the track chain and the second track chain having an inboard side and an outboard side and defining a track pin bore and a bushing bore communicating between the inboard and outboard sides, and further comprising a plurality of track pins and a plurality of bushings coupling together the track chain and the second track chain.

17. A link for a track chain in a ground-engaging track system comprising:
    an elongate link body including:
    a shoe surface configured to contact a track shoe coupled to the elongate link body, and
    a rail surface opposite the shoe surface, the rail surface having a first end section, a middle section, and a second end section; and
    first, second, and third crowns on the rail surface that each define a convex portion of the rail surface, wherein the first crown is positioned on the first end section, the second crown is positioned on the second end section, and the third crown is positioned on the middle section, wherein the middle section has a middle section length and the first and second end sections have equal end section lengths, and wherein the length of middle section is greater than the sum of the lengths of the first end section and the second end section, and wherein the first, second, and third crowns are configured to delay scallop formation in the rail surface.

18. The link of claim 17, wherein the first crown, the second crown, and the third crown form the entire rail surface.

* * * * *